United States Patent
Solyom et al.

(10) Patent No.: US 8,775,060 B2
(45) Date of Patent: Jul. 8, 2014

(54) APPARATUS AND METHOD FOR LATERAL CONTROL OF A HOST VEHICLE DURING TRAVEL IN A VEHICLE PLATOON

(71) Applicant: Volvo Car Corporation, Gothenburg (SE)

(72) Inventors: Stefan Solyom, Olofstorp (SE); Badr Bin Salamah, Riyadh (SA); Arash Idelchi, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/938,696

(22) Filed: Jul. 10, 2013

(65) Prior Publication Data
US 2014/0019031 A1    Jan. 16, 2014

(30) Foreign Application Priority Data
Jul. 12, 2012    (EP) .................................... 12176186

(51) Int. Cl.
*G06F 19/00*    (2011.01)
*G08G 1/00*    (2006.01)
*B60T 8/1755*    (2006.01)
*B60W 30/12*    (2006.01)

(52) U.S. Cl.
CPC ............... *G08G 1/22* (2013.01); *B60T 2201/08* (2013.01); *B60T 8/17557* (2013.01); *B60W 30/12* (2013.01); *B60T 2201/083* (2013.01); *B60T 2201/087* (2013.01)
USPC ................. 701/117; 701/23; 701/24; 701/41; 701/70; 701/96; 701/118; 701/300; 701/301; 340/901; 340/902; 340/903; 340/910; 340/911; 422/24; 422/186; 180/168

(58) Field of Classification Search
CPC ... G08G 1/22; B60T 2201/08; B60T 8/17557; B60T 2201/083; B60T 2201/087; B60W 30/12
USPC ............... 701/1, 23, 24, 117, 118, 41, 70, 96, 701/300, 301; 340/435, 901, 902, 903, 915, 340/910, 911, 913, 914, 917, 920, 932, 933, 340/934, 936, 988; 89/33.2, 142, 192; 422/24, 186.3; 700/3, 83; 318/587; 180/168
See application file for complete search history.

(56) References Cited

U.S. PATENT DOCUMENTS 8,352,111 B2 * 1/2013 Mudalige ........................ 701/24
(Continued)

OTHER PUBLICATIONS

Extended European Search Report for EP 12176186.0, Completed by the European Patent Office on Nov. 16, 2012, 8 Pages.
Idelchi et al. Website http://publications.lib.chalmers.se/records/fulltext/153348.pdf, Jan. 1, 2011, 73 Pages, "Lateral Control of Vehicle Platoons."
Middleton et al. IEEE Transactions on Automatic Control Jul. 2010, vol. 55, No. 7, p. 1519-1530, "String Instability in Classes of Linear Time Invariant Formation Control With Limited Communication Range."

(Continued)

*Primary Examiner* — McDieunel Marc
(74) *Attorney, Agent, or Firm* — Brooks Kushman P.C.

(57) ABSTRACT

An apparatus and method are described for lateral control of a host vehicle (F) during travel in a vehicle platoon. The apparatus and method include acquiring a control signal u and a lateral error ϵ relative to a target vehicle (L) of a preceding vehicle (T) travelling in the vehicle platoon, filtering the received lateral error ϵ, filtering the received control signal u, and executing via a processor a control algorithm for actuating lateral control of the host vehicle (F).

19 Claims, 4 Drawing Sheets

(56) References Cited

U.S. PATENT DOCUMENTS

| | | | |
|---|---|---|---|
| 8,352,112 B2 * | 1/2013 | Mudalige | 701/24 |
| 8,676,466 B2 * | 3/2014 | Mudalige | 701/93 |
| 2010/0256852 A1 * | 10/2010 | Mudalige | 701/24 |
| 2011/0196514 A1 | 8/2011 | Cao et al. | |
| 2013/0218365 A1 * | 8/2013 | Caveney et al. | 701/1 |

OTHER PUBLICATIONS

Lee et al. Intelligent Transportation Systems Proceedings IEEE Oct. 5-8, 1999, p. 605-610, "Lonitudinal and Lateral Control Development for a Platoon of Vehicles."

* cited by examiner

APPARATUS AND METHOD FOR LATERAL CONTROL OF A HOST VEHICLE DURING TRAVEL IN A VEHICLE PLATOON

CROSS-REFERENCE TO RELATED APPLICATIONS

This application claims priority to European Patent Application No. 12176186.0 filed Jul. 12, 2012, the disclosure of which is incorporated in its entirety by reference herein.

TECHNICAL FIELD

Embodiments herein relate to an apparatus and method for lateral control of a host vehicle during travel in a vehicle platoon.

BACKGROUND

The concept of having a vehicle platoon moving in unison, whether in longitudinal or lateral direction, is of considerable interest when seeking to decrease traffic congestion and gas consumption, improve driver comfort and safety, and limit emissions.

In the platoon, the objective to achieve, for the longitudinal case, is each vehicle maintaining a safe and predetermined distance to the vehicle in front, called the leader. The distance would typically be dependent of velocity, since higher velocities require larger safety-distances. Arrangements are proposed through which a driver of a vehicle in such a platoon may allow the throttle and the brakes of the vehicle to be handled automatically.

With respect to lateral control of a vehicle traveling in such a platoon the objective is to follow the path of the leading vehicle and mimic its maneuvers in a stable manner. This may also be performed in an automated manner using a control algorithm. The driver may then hand over steering of the vehicle to an onboard computer.

However, much of the earlier research has been focused on utilization of vehicle platoons operating in specialized infrastructure, such as highways with magnets integrated into the path and used as road markings.

Recent developments, however, are more tended toward the implementation of platoons in unmodified roads using available sensor information and communication, such as the angle and distance to a preceding vehicle, in order to determine acceleration, braking or steering of a subject vehicle.

According to the latter concept; each vehicle will depending on its state and the state of the neighboring vehicle utilize a control strategy to follow its movements and maintain the platoon. The platoon can under these assumptions be seen as decentralized.

One previously known example is given in U.S. Pat. No. 5,781,119, which relates to a vehicle guiding system that enables a plurality of vehicles to run in a platoon. When the vehicle runs in the platoon, a front running vehicle detects its displacement from a magnetic nail, and calculates a steering amount to be corrected (i.e. control variables). The front running vehicle not only controls its own movements on the basis of the control variable data but also transmits them to a following vehicle. The following vehicle does not detect its displacement from the magnetic nail, but controls its steering amount on the basis of the received control variable data. The following vehicle includes a correcting unit for correcting the received control variable data depending upon the type of the front running vehicle and the type of the following vehicle. The following vehicle includes a transmitter for transmitting the corrected control variable data to further following vehicles. The further following vehicle simply receives the control variable data from the following vehicle, and does not calculate its own control variables. Each of the following vehicles is controlled on the basis of the corrected control variable data received from a vehicle ahead.

However, a serious issue that may arise here is error propagation throughout the platoon. In the case of the first following car being laterally displaced relative to the leader, the displacement might be amplified to the second follower, and so on.

This problem needs to be either eradicated or bounded to avoid vehicles further down the line leaving the lane.

SUMMARY

Embodiments herein aim to provide an apparatus for lateral control of a host vehicle during travel in a vehicle platoon.

This is provided through an apparatus for lateral control of a host vehicle during travel in a vehicle platoon comprising: means for acquiring a control signal u and a lateral error $\epsilon$ relative to a target vehicle of a preceding vehicle travelling in the vehicle platoon; filter means for filtering the received lateral error $\epsilon$; filter means for filtering the received control signal u; and controller means for executing a control algorithm for actuating lateral control of the host vehicle.

The provision of control signal u and a lateral error $\epsilon$ relative to a target vehicle of a preceding vehicle travelling in the vehicle platoon and filtering of these signals provides for string stability through eradicating or bounding any problems incurred by error propagation throughout a vehicle platoon.

According to a second aspect the means for acquiring a control signal u and a lateral error $\epsilon$ relative to a target vehicle of a preceding vehicle comprises one or more sensors such as radar based sensors, vision based sensors or lidar based sensors.

The provision of means for acquiring a control signal u and a lateral error $\epsilon$ using one or more sensors, as described for the second aspect, provides for lateral control of a host vehicle during travel in a vehicle platoon which is not dependent on any vehicle-to-vehicle communication making it completely autonomous.

According to a third aspect the apparatus further comprises means for relaying information on the host vehicle's control signal u and the host vehicle's lateral error $\epsilon$ relative to the target vehicle to a following vehicle in the vehicle platoon.

The provision of means for relaying this information to a following vehicle in the vehicle platoon, as described for the third aspect, provides for the following vehicle being able to follow the leading target vehicle of the platoon without communicating directly with that vehicle.

According to a fourth aspect the apparatus further comprises means for receiving a control signal u and a lateral error $\epsilon$ relative to the target vehicle from a preceding vehicle travelling in the vehicle platoon.

The provision of means for receiving this information from a preceding vehicle travelling in the vehicle platoon, as described for the fourth aspect, provides for the host vehicle being able to follow the leading target vehicle of the platoon without communicating directly with that vehicle.

According to a fifth aspect the filter means for filtering the received lateral error $\epsilon$ relative to the target vehicle are arranged to perform filtering such that, given the host vehicles capabilities $G_{A_y}$ and the host vehicles controller C, the lateral error $\epsilon$ is prevented from increasing when relayed downwards in the chain of vehicles travelling in the vehicle platoon, and the filter means for filtering the received control signal u are arranged to cancel unwanted effects on the chain of the control signal u of the target vehicle, and the controller means are arranged to guarantee local stability of the immediate following of the target vehicle.

Filtering and control, as described for the fifth aspect, provides for increased string stability through eradicating or bounding any problems incurred by error propagation throughout a vehicle platoon.

Further embodiments herein aim to provide a method for lateral control of a host vehicle during travel in a vehicle platoon.

This is provided through a method comprising the steps of: acquiring a control signal u and a lateral error ϵ relative to a target vehicle of a preceding vehicle travelling in the vehicle platoon; filtering the received lateral error ϵ; filtering the received control signal u; executing a control algorithm for actuating lateral control of the host vehicle.

The provision of control signal u and a lateral error ϵ relative to a target vehicle of a preceding vehicle travelling in the vehicle platoon and filtering of these signals provides for string stability through eradicating or bounding any problems incurred by error propagation throughout a vehicle platoon.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

In overview, embodiments herein, seek to eradicate or bound any problems incurred by error propagation throughout a vehicle platoon in order to avoid vehicles further down the line leaving the lane. This phenomenon of error increase downstream the platoon is called string instability.

In the following two points for dealing with automated platoons are suggested; a control strategy that ensures string stability (i.e. damping the propagation of errors in the platoon), and the assumptions or infrastructures necessary to implement this control strategy.

Figure 1:
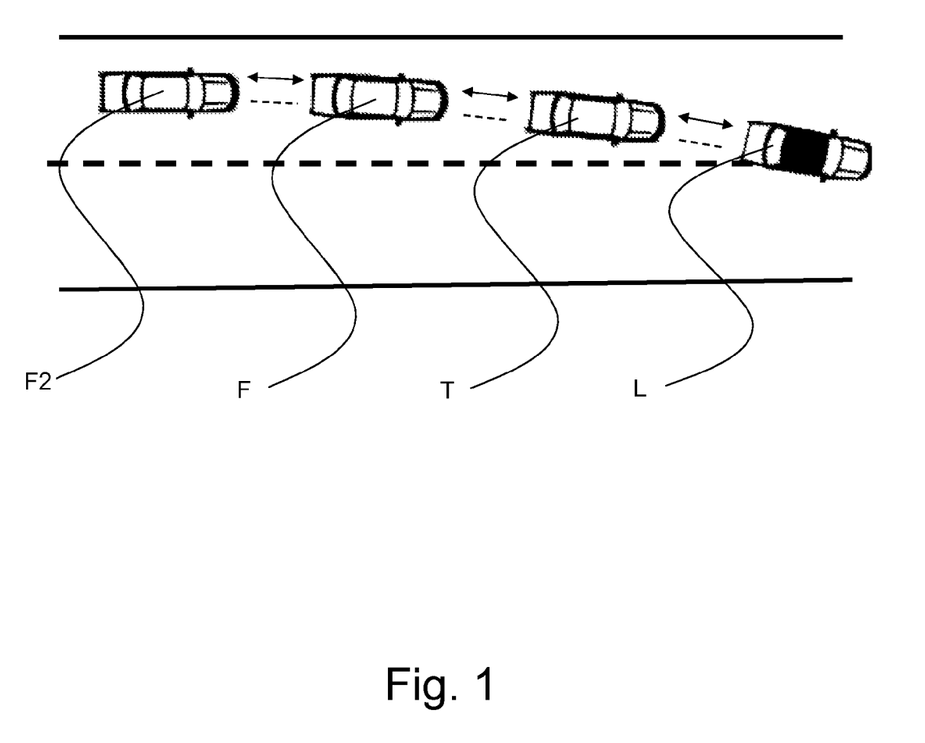
FIG. 1 is a schematic illustration of a vehicle platoon performing a lane-change with the leader vehicle marked by a black roof.

FIG. 1 illustrates the proposed concept where each vehicle will, depending on its state and the state of the neighboring vehicle, utilize a control strategy to follow its movements and maintain the platoon. The vehicle platoon may under these assumptions be seen as decentralized.

FIG. 1 thus illustrates a lead vehicle of the platoon L and a vehicle targeted T by a host vehicle (follower) F. The host vehicle F does not have any contact with the platoon leader L, but it will follow its path implicitly due to the proposed control topology. That is, the host vehicle F has contact only with the target vehicle T but will implicitly follow the path of the platoon leader L without actually needing an explicit communication with it. Information relating to the platoon leader L is cascaded down through the chain of the proposed control topology.

Figure 2:
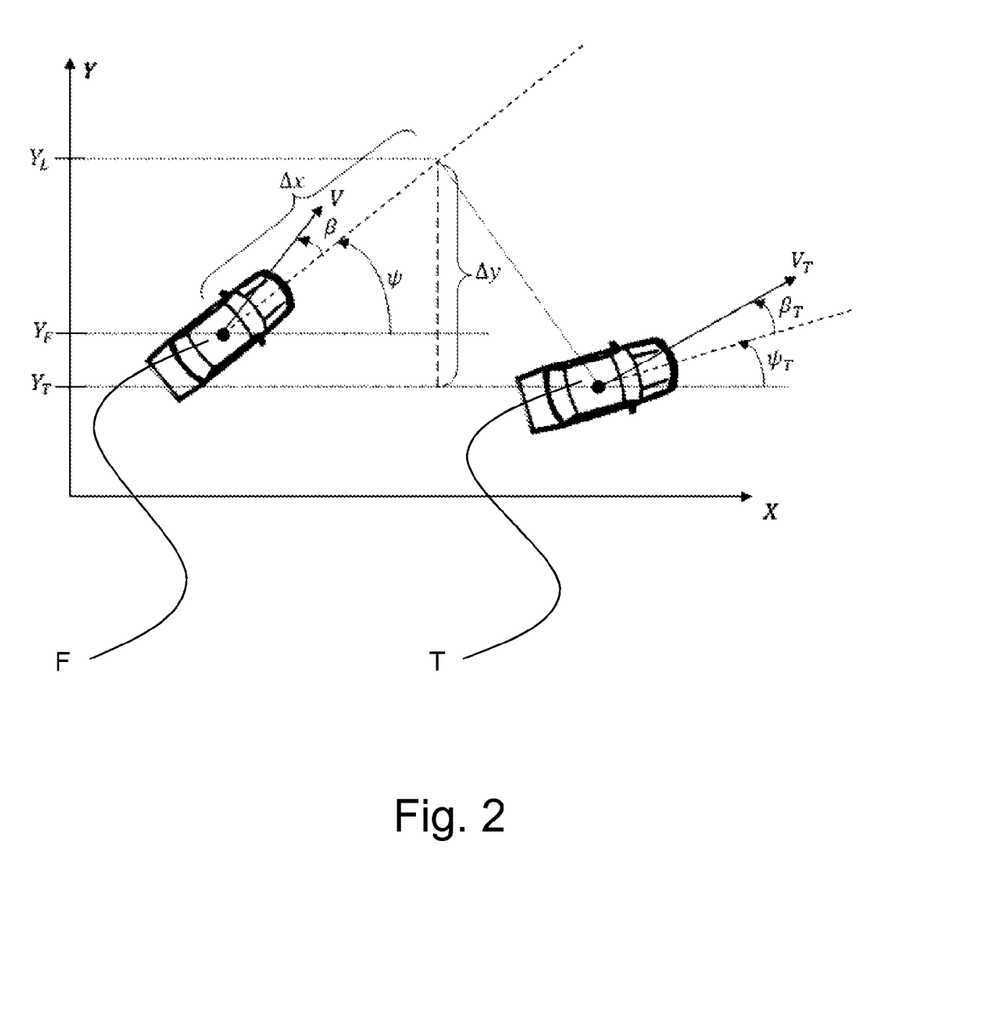
FIG. 2 is a schematic illustration of the geometric interaction of two vehicles of a vehicle platoon.

FIG. 2 schematically illustrates two vehicles in a vehicle platoon, the host vehicle F and the vehicle targeted T by the host vehicle F, and their associated orientations. With a complete dynamical model of a vehicle obtained, it is of interest to see how the system behaves in the case of the host vehicle F following a target vehicle T. For the sake of simplification, the leading target vehicle T is initially modelled as a point at distance L from the centre of gravity of the follower host vehicle F.

The lateral deviation, that is the following host vehicle's F lateral offset from the target vehicle's T position, can be modelled as an interaction of the two vehicles' states. For sake of simplicity consider that both vehicles maintain the same longitudinal velocity. However the conclusions hold for the general case as well.

The relation shows that the lateral deviation changes according to the rotation of the following host vehicle F as well as the difference in the direction of motion of the two vehicles.

By letting $\Delta y$ be defined as $Y_L - Y_T$, there are two distances to consider; the first being the deviation from centre of gravity to centre of gravity, $Y_F - Y_T$, which is dependent on the distance traveled in the y-direction $$Y_F(t) - Y_T(t) = V_x \int_{t_0}^{t} (\psi(t) + \beta(t))dt - V_x \int_{t_0}^{t} (\psi_T(t) + \beta_T(t))dt \tag{1}$$

where $\psi_T$ and $\beta_T$ denote the yaw- and slip-angle of the leading target vehicle T, respectively, with the assumption of the initial condition for $t_0$ being no lateral offset.

The second length is from the projected point at a distance $\Delta x$ to the centre of gravity of the leading target vehicle T as seen in a coordinate system fixed to the host vehicle F, and can for small deviations be approximated as the look-ahead distance L, as follows.

$$Y_L(t) - Y_F(t) = L \sin \psi(t) \tag{2}$$

Thus, by approximating for small angles and adding equations (1) and (2), the following dynamic equation describing the rate of change of the lateral deviation is obtained.

$$\Delta \dot{y} = L\dot{\psi} + V_x(\psi - \psi_T) + V_x(\beta - \beta_T) \tag{3}$$

Where $V_x$ denotes the velocity from the centre of gravity in the direction of the yaw and $\beta$ is the slip-angle at the centre of gravity of the vehicle and can be approximated (for sufficiently small angles) as $\beta = \dot{y}/V_x$ When augmenting the model described below with this expression while performing the substitution $\dot{y} = V_x \beta$ as above, the following state-space formulation is obtained.

$$\dot{x} = \begin{bmatrix} -\frac{C_r + C_f}{mV_x} & \frac{C_r l_r - C_f l_f}{mV_x^2} - 1 & 0 & 0 \\ \frac{C_r l_r - C_f l_f}{I_z} & -\frac{C_r l_r^2 + C_f l_f^2}{V_x I_z} & 0 & 0 \\ 0 & 1 & 0 & 0 \\ V_x & L & V_x & 0 \end{bmatrix} x + \begin{bmatrix} \frac{C_f}{mV_x} \\ \frac{C_f l_f}{I_z} \\ 0 \\ 0 \end{bmatrix} \delta - \begin{bmatrix} 0 \\ 0 \\ 0 \\ w \end{bmatrix} \quad (4)$$

where $x=[\beta\ \dot{\psi}\ \psi\ \Delta y]^T$, $w=V_x(\beta_T+\psi_T)$ and the state y removed since it is of no interest in this case.

In standard form, (4) can be written as $$\dot{x}=Ax+B\delta \quad (5)$$

where the matrices A and B are as above and the disturbance vector w can be ignored.

If instead the point followed is on the rear bumper of the leading target vehicle T, the expression for w should be modified to $$w=V_x(\beta_T+\psi_T)-l_{rb}\dot{\psi}_T \quad (6)$$

where the new term relates the orientation of followed point on the target vehicle's T rear bumper. It has to also be noted that the look-ahead distance L can be factored into two parts, a constant part consisting of the distance $l_{fb}$ from the host vehicle's F centre of gravity to the front bumper of the host vehicle F and a variable term which shall be denoted $L_a$ denoting the distance from the following host vehicle's F front bumper to the leading target vehicle's T rear bumper.

The term w relates the variations induced by the motions of the leading target vehicle T; hence, seen from the perspective of the following host vehicle F, there is no control over it. Treating it as a measured disturbance, the whole system can be visualized in the block-diagram of FIG. 3, where the measured output coming from the sensor is the lateral deviation.

Based on the model introduced above, the transfer-function from the input to the last state is derived as $$G_{\Delta y}(s)=C(sI-A)^{-1}B+D \quad (7)$$

where C=[0 0 0 1] since the last state is of interest, and D=0. Therefore, $$G_{\Delta y}(s) = \frac{(e_0 + f_0 L)s^2 + \left(\frac{(b_0 f_0 - d_0 e_0) + (c_0 e_0 - a_0 f_0)L}{V_x}\right)s + (c_0 e_0 - a_0 f_0)}{s^4 - \left(\frac{a_0 + d_0}{V_x}\right)s^3 + \left(\frac{a_0 d_0 - b_0 c_0}{V_x^2} + c_0\right)s^2} \quad (8)$$

where the varying quantities longitudinal velocity $V_x$ the look-ahead distance L are extracted from the vehicle parameters and the remaining parameters involve quantities that are assumed not to vary at all or negligibly during manoeuvres, such as vehicle mass, cornering stiffness, various lengths, etc.

Similarly define the vehicle's transfer function $G_{rb}$.

$$G_{rb}(s) = \frac{(e_0 - f_0 l_{rb})s^2 + \left(\frac{(c_0 e_0 - a_0 f_0)(-l_{rb} + l_r)L}{V_x}\right)s + (c_0 e_0 - a_0 f_0)}{s^4 - \left(\frac{a_0 + d_0}{V_x}\right)s^3 + \left(\frac{a_0 d_0 - b_0 c_0}{V_x^2} + c_0\right)s^2} \quad (9)$$

The following notations are used in the equations above:

$$a_0 = -\frac{C_r + C_f}{m} \quad (10)$$

$$b_0 = \frac{C_r l_r - C_f l_f}{m} \quad (11)$$

$$c_0 = \frac{C_r l_r - C_f l_f}{I_z} \quad (12)$$

$$d_0 = -\frac{C_r l_r^2 + C_f l_f^2}{I_z} \quad (13)$$

$$e_0 = \frac{C_f}{m} \quad (14)$$

$$f_0 = \frac{C_f l_f}{I_z} \quad (15)$$

Where $C_f$ denotes stiffness coefficient for front wheel and $C_r$ for rear wheel and m denotes the mass, $l_f$ denotes length to front wheels and $l_r$ denotes length to rear wheels and $I_z$ denotes moment of inertia, Then the lateral deviation of the vehicle "i" to "i−1" with a simple local feedback controller C can be written as:

$$\epsilon_i = G_{\Delta y} u_i - G_{rb} u_{i-1} \quad (16)$$

Figure 3:
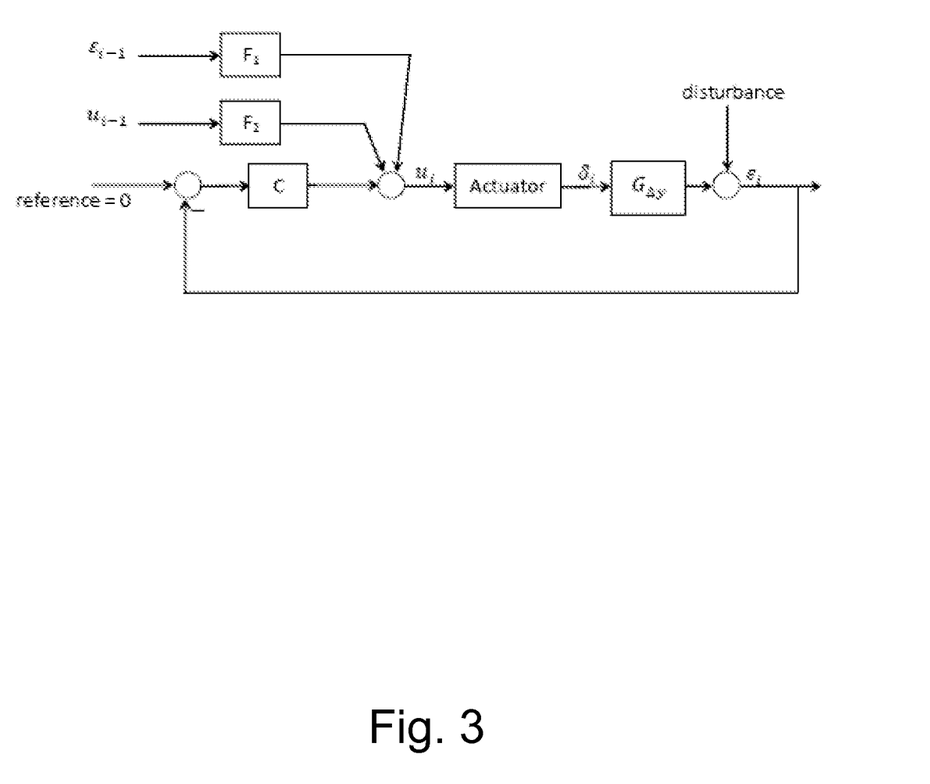
FIG. 3 is a schematic illustration of the proposed control topology.

In accordance with the proposed solution the information to be relayed is that of the target vehicle's T control signal and with the addition of the target vehicle's T lateral error. The control topology is shown in FIG. 3. Moreover the strategy contains a local controller C that stabilizes the system based on the error to the target vehicle's T.

FIG. 3 also illustrates the proposed communication topology where the control signal $u_i$ and the lateral error $\epsilon_i$ are the signals transmitted to the host vehicle F.

In FIG. 3 $F_1$ and $F_2$ are filters, $\delta$ is the steering angle and C the local controller. The controller may include a microprocessor, microcontroller, programmable digital signal processor (DSP) or other programmable device. The controller may also, or instead, include an application specific integrated circuit (ASIC), a programmable gate array or programmable array logic, a programmable logic device, or a digital signal processor (DSP). Where the control unit includes a programmable device such as a microprocessor, microcontroller or programmable digital signal processor, the control unit may further include computer executable code that controls operation of the programmable device.

As mentioned above the communicated information is both the control signal $u_i$ and the lateral error $\epsilon_i$. Following the procedure presented above, the first follower's control signal can be written as $$u_1 = -C\epsilon_1 + F_2\delta_0 \quad (17)$$

From the first to second follower, the following expression is obtained $$u_2 = -C\epsilon_2 + F_1\epsilon_1 + F_2 u_1 = -C\epsilon_2 + F_1\epsilon_1 - F_2 C\epsilon_1 + F_2^2\delta_0 \quad (18)$$

similarly, the expressions for the third and fourth followers are $$u_3 = -C\epsilon_3 + F_1\epsilon_2 + F_2 u_2 = -C\epsilon_3 + F_1\epsilon_2 - F_2 C\epsilon_2 + F_1 F_2\epsilon_1 + F_2^2 u_1 \quad (19)$$

$$u_4 = -C\epsilon_4 + F_1\epsilon_3 + F_2 u_3 = -C\epsilon_4 + F_1\epsilon_3 - F_2 C\epsilon_3 + F_1 F_2\epsilon_2 + F_2^2 u_2 \quad (20)$$

Thus, from equations (17) to (20), for any follower i, the control signal can be written as $$u_i = -C\varepsilon_i + F_1\varepsilon_{i-1} + F_2 u_{i-1} = \\ -C\varepsilon_i + F_1\varepsilon_{i-1} - F_2 C\varepsilon_{i-1} + F_1 F_2 \varepsilon_{i-2} + F_2^2 u_{i-2} \quad (21)$$

Substituting (21) in (16), the following relation is obtained $$\varepsilon_i = G_{\Delta y}\begin{pmatrix} -C\varepsilon_i + F_1\varepsilon_{i-1} - F_2 C\varepsilon_{i-1} + \\ F_1 F_2 \varepsilon_{i-2} + F_2^2 u_{i-2} \end{pmatrix} - G_{rb}\begin{pmatrix} -C\varepsilon_{i-1} + F_1\varepsilon_{i-2} + \\ F_2 u_{i-2} \end{pmatrix} = \\ -G_{\Delta y} C\varepsilon_i + \begin{pmatrix} G_{\Delta y} F_1 + \\ (G_{rb} - G_{\Delta y} F_2)C \end{pmatrix}\varepsilon_{i-1} + \\ F_1(G_{\Delta y} F_2 - G_{rb})\varepsilon_{i-2} + F_2(G_{\Delta y} F_2 - G_{rb})u_{i-2} \quad (22)$$

Thus, the expression may be rewritten as $$\varepsilon_i = \frac{G_{\Delta y} F_1 + (G_{rb} - G_{\Delta y} F_2)C}{1 + G_{\Delta y} C}\varepsilon_{i-1} + \\ \frac{F_1(G_{\Delta y} F_2 - G_{rb})}{1 + G_{\Delta y} C}\varepsilon_{i-2} + \frac{F_2(G_{\Delta y} F_2 - G_{rb})}{1 + G_{\Delta y} C}u_{i-2} \quad (23)$$

As can be seen, the only way to eliminate the unwanted expressions is by setting the feed-forward filter $F_2$ to be $$F_2 = \frac{G_{rb}}{G_{\Delta y}} \quad (24)$$

By selecting the filter this way would also result in the ratio of the lateral errors being $$\varepsilon_i = \frac{G_{\Delta y} F_1 + 0}{1 + G_{\Delta y} C}\varepsilon_{i-1} + 0 * \varepsilon_{i-2} + 0 * u_{i-2} = \frac{G_{\Delta y} F_1}{1 + G_{\Delta y} C}\varepsilon_{i-1} \quad (25)$$

$$\frac{\varepsilon_i}{\varepsilon_{i-1}} = \frac{G_{\Delta y} F_1}{1 + G_{\Delta y} C} \forall\, i \quad (26)$$

It is now possible to control how the error dissipates through the platoon by the selection of the feed-forward filter $F_1$. It can also be noticed that a designer has total freedom in the selection of $F_1$ as its selection is not dependent on the disappearance of the unwanted terms in (23).

In the relations above, there has been assumed a perfect knowledge of the vehicle parameters. This is rather difficult to achieve in real-life applications, even it vehicle to vehicle communication is assumed. It is therefore of interest to analyse the impact of such uncertainties on the string stability performance of the platoon.

This may be done by examining the $L_2$-induced norm from $\epsilon_i$ to $\epsilon_{(i-1)}$. For a linear system the $L_2$-induced gain is the maximum gain of the system over all frequency ranges, that is the highest gain of the system that is obtained for an input sinus signal of any frequency. It is to note that in linear system theory any signal can be described as a combination of sinus signals, hence the generality of the result.

It can be shown that the $L_2$-induced gain is:

$$\gamma_i = \gamma_1 + \frac{\|H_2 - CH_3\|_\infty}{\gamma_{i-1}} + \sum_{j=1}^{i-3}\left[\frac{\|H_3(F_1 - F_2 C)F_2^{j-1}\|_\infty}{\prod_{j=1}^{j+1}\gamma_{i-k-1}}\right] \quad (27)$$

where, $\gamma_1$ is the $L_2$-induced gain from $H_1$, i.e. $\gamma_1 = \|H_1\|_\infty$ and, $$H_1 = \frac{G_{\Delta y} F_1 + (G_{rb} - G_{\Delta y} F_2)C}{1 + G_{\Delta y} C} \quad (28)$$

$$H_2 = \frac{F_1(G_{\Delta y} F_2 - G_{rb})}{1 + G_{\Delta y} C} \quad (29)$$

$$H_3 = \frac{F_2(G_{\Delta y} F_2 - G_{rb})}{1 + G_{\Delta y} C} \quad (30)$$

This $L_2$-induced gain needs to be less than 1 for each vehicle i, in order to get a string stable system. In effect this can mean that in some cases the string-stability of a platoon of infinite vehicles is lost, however the filters $F_1$, $F_2$, and local controller C can be designed so that the string stability is maintained for a finite number of vehicles even in case of an assumed worst case model uncertainty.

Figure 4:
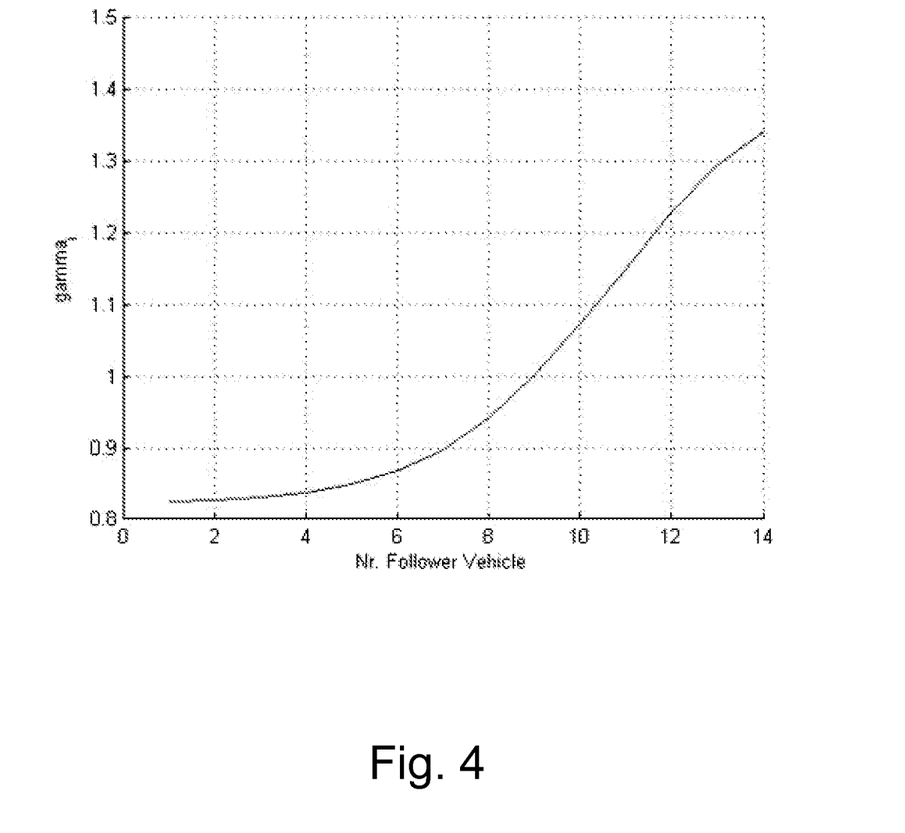
FIG. 4 shows for a numerical example the schematic illustration of the $L_2$-induced gain for each vehicle in a platoon.

Below is provided a numerical example for the case of a PD controller as C, and $$F_1 = 0.6C \text{ and } F_2 = \frac{G_{rb}}{G_{\Delta y}} \quad (31)$$

one gets for a variation of 25% on the vehicle mass and 25% on its cornering stiffnesses, a vehicle platoon which is string stable up to the 8 follower vehicle at a 1l look-ahead distance (bumper to bumper) at a speed of 40 m/s as shown in FIG. 4. The crossover frequency of the local controller is 0.5 rad/s and the phase margin 45 degrees.

Thus in accordance herewith is proposed an apparatus for lateral control of a host vehicle F during travel in a vehicle platoon. The proposed apparatus comprises: means for acquiring a control signal u and a lateral error $\epsilon$ relative to a target vehicle L of a preceding vehicle T travelling in the vehicle platoon; filter means $F_1$ for filtering the received lateral error $\epsilon$; filter means $F_2$ for filtering the received control signal u; and controller means C for executing a control algorithm for actuating lateral control of the host vehicle F.

In embodiments hereof the means for acquiring a control signal u and a lateral error $\epsilon$ relative to a target vehicle L of a preceding vehicle T comprises one or more sensors such as RADAR (RAdio Detection And Ranging) based sensors, vision based sensors, e.g. cameras, or LIDAR (Light Detection And Ranging) based sensors.

In further embodiments hereof the apparatus further comprises means for relaying information on the host vehicle's F control signal u and the host vehicle's F lateral error $\epsilon$ relative to the target vehicle L to a following vehicle F2 in the vehicle platoon. In yet further embodiments hereof the apparatus further comprises means for receiving a control signal u and a lateral error ϵ relative to the target vehicle L from a preceding vehicle T travelling in the vehicle platoon. Such means for relaying and means for receiving may respectively comprise a transmitter and receiver configured to transmit and receive wireless signals, or a similarly configured transceiver.

In still further embodiments hereof the filter means $F_1$ for filtering the received lateral error ϵ relative to the target vehicle L are arranged to perform filtering such that, given the host vehicles F capabilities $G_{A_y}$ and the host vehicles F controller C, the lateral error ϵ is prevented from increasing when relayed downwards in the chain of vehicles travelling in the vehicle platoon, and the filter means $F_2$ for filtering the received control signal u are arranged to cancel unwanted effects on the chain of the control signal u of the target vehicle L, and the controller means C are arranged to guarantee local stability of the immediate following of the target vehicle L as described above.

In accordance with the present application is also envisaged a method for lateral control of a host vehicle during travel in a vehicle platoon. The proposed method comprises the steps of: acquiring a control signal u and a lateral error ϵ relative to a target vehicle L of a preceding vehicle T travelling in the vehicle platoon; filtering the received lateral error ϵ; filtering the received control signal u; executing a control algorithm for actuating lateral control of the host vehicle F.

In accordance with the present application is also envisaged an automotive vehicle comprising an apparatus for lateral control of a host vehicle F during travel in a vehicle platoon as described above.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. An apparatus for lateral control of a host vehicle (F) during travel in a vehicle platoon, the apparatus comprising:
    means for acquiring a control signal u and a lateral error ϵ relative to a target vehicle (L) of a preceding vehicle (T) travelling in the vehicle platoon;
    filter means ($F_1$) for filtering the received lateral error ϵ;
    filter means ($F_2$) for filtering the received control signal u; and
    controller means (C) for executing a control algorithm for actuating lateral control of the host vehicle (F).

2. An apparatus according to claim 1 wherein the means for acquiring a control signal u and a lateral error ϵ relative to a target vehicle (L) of a preceding vehicle (T) comprises one or more sensors such as radar based sensors, vision based sensors or lidar based sensors.

3. An apparatus according to claim 2 further comprising means for receiving a control signal u and a lateral error ϵ relative to the target vehicle (L) from a preceding vehicle (T) travelling in the vehicle platoon.

4. An apparatus according to claim 3 wherein the filter means ($F_1$) for filtering the received lateral error ϵ relative to the target vehicle (L) are arranged to perform filtering such that, given the host vehicles (F) capabilities $G_{A_y}$ and the host vehicles (F) controller C, the lateral error ϵ is prevented from increasing when relayed downwards in the chain of vehicles travelling in the vehicle platoon, and the filter means ($F_2$) for filtering the received control signal u are arranged to cancel unwanted effects on the chain of the control signal u of the target vehicle (L), and the controller means (C) are arranged to guarantee local stability of the immediate following of the target vehicle (L).

5. An apparatus according to claim 1 further comprising means for relaying information on the host vehicle's (F) control signal u and the host vehicle's (F) lateral error ϵ relative to the target vehicle (L) to a following vehicle (F2) in the vehicle platoon.

6. An apparatus according to claim 5 wherein the filter means ($F_1$) for filtering the received lateral error ϵ relative to the target vehicle (L) are arranged to perform filtering such that, given the host vehicles (F) capabilities $G_{A_y}$ and the host vehicles (F) controller C, the lateral error ϵ is prevented from increasing when relayed downwards in the chain of vehicles travelling in the vehicle platoon, and the filter means ($F_2$) for filtering the received control signal u are arranged to cancel unwanted effects on the chain of the control signal u of the target vehicle (L), and the controller means (C) are arranged to guarantee local stability of the immediate following of the target vehicle (L).

7. An apparatus according to claim 5 further comprising means for receiving a control signal u and a lateral error ϵ relative to the target vehicle (L) from a preceding vehicle (T) travelling in the vehicle platoon.

8. An apparatus according to claim 7 wherein the filter means ($F_1$) for filtering the received lateral error ϵ relative to the target vehicle (L) are arranged to perform filtering such that, given the host vehicles (F) capabilities $G_{A_y}$ and the host vehicles (F) controller C, the lateral error ϵ is prevented from increasing when relayed downwards in the chain of vehicles travelling in the vehicle platoon, and the filter means ($F_2$) for filtering the received control signal u are arranged to cancel unwanted effects on the chain of the control signal u of the target vehicle (L), and the controller means (C) are arranged to guarantee local stability of the immediate following of the target vehicle (L).

9. An automotive vehicle comprising an apparatus for lateral control of a host vehicle (F) during travel in a vehicle platoon according to claim 1.

10. A method for lateral control of a host vehicle (F) during travel in a vehicle platoon, the method comprising:
    acquiring, via a sensor, a control signal u and a lateral error ϵ relative to a target vehicle (L) of a preceding vehicle (T) travelling in the vehicle platoon;
    filtering the received lateral error ϵ;
    filtering the received control signal u; and
    executing, via a processor, a control algorithm for actuating lateral control of the host vehicle (F).

11. An apparatus for lateral control of a host vehicle (F) during travel in a vehicle platoon, the apparatus comprising:
    a sensor for acquiring a control signal u and a lateral error ϵ relative to a target vehicle (L) of a preceding vehicle (T) travelling in the vehicle platoon;
    a filter ($F_1$) for filtering the received lateral error ϵ;
    a filter ($F_2$) for filtering the received control signal u; and
    a controller (C) for executing a control algorithm for actuating lateral control of the host vehicle (F).

12. An apparatus according to claim 11 wherein the sensor for acquiring a control signal u and a lateral error ϵ relative to a target vehicle (L) of a preceding vehicle (T) comprises one or more radar based sensors, vision based sensors or lidar based sensors.

13. An apparatus according to claim 12 further comprising a receiver for receiving a control signal u and a lateral error ϵ relative to the target vehicle (L) from a preceding vehicle (T) travelling in the vehicle platoon.

14. An apparatus according to claim 13 wherein the filter ($F_1$) for filtering the received lateral error ϵ relative to the target vehicle (L) is arranged to perform filtering such that, given the host vehicles (F) capabilities $G_{A_y}$ and the host vehicles (F) controller C, the lateral error ϵ is prevented from increasing when relayed downwards in the chain of vehicles travelling in the vehicle platoon, and the filter ($F_2$) for filtering the received control signal u is arranged to cancel unwanted effects on the chain of the control signal u of the target vehicle (L), and the controller (C) is arranged to guarantee local stability of the immediate following of the target vehicle (L).

15. An apparatus according to claim 11 further comprising a transmitter for relaying information on the host vehicle's (F) control signal u and the host vehicle's (F) lateral error ϵ relative to the target vehicle (L) to a following vehicle (F2) in the vehicle platoon.

16. An apparatus according to claim 15 further comprising a receiver for receiving a control signal u and a lateral error ϵ relative to the target vehicle (L) from a preceding vehicle (T) travelling in the vehicle platoon.

17. An apparatus according to claim 15 wherein the filter ($F_1$) for filtering the received lateral error ϵ relative to the target vehicle (L) is arranged to perform filtering such that, given the host vehicles (F) capabilities $G_{A_y}$ and the host vehicles (F) controller C, the lateral error ϵ is prevented from increasing when relayed downwards in the chain of vehicles travelling in the vehicle platoon, and the filter ($F_2$) for filtering the received control signal u is arranged to cancel unwanted effects on the chain of the control signal u of the target vehicle (L), and the controller (C) is arranged to guarantee local stability of the immediate following of the target vehicle (L).

18. An apparatus according to claim 17 wherein the filter ($F_1$) for filtering the received lateral error ϵ relative to the target vehicle (L) is arranged to perform filtering such that, given the host vehicles (F) capabilities $G_{A_y}$ and the host vehicles (F) controller C, the lateral error ϵ is prevented from increasing when relayed downwards in the chain of vehicles travelling in the vehicle platoon, and the filter ($F_2$) for filtering the received control signal u is arranged to cancel unwanted effects on the chain of the control signal u of the target vehicle (L), and the controller (C) is arranged to guarantee local stability of the immediate following of the target vehicle (L).

19. An automotive vehicle comprising an apparatus for lateral control of a host vehicle (F) during travel in a vehicle platoon according to claim 11.

\* \* \* \* \*